United States Patent
Kuo et al.

(10) Patent No.: US 6,780,523 B2
(45) Date of Patent: Aug. 24, 2004

(54) WATERBORNE ACETOACETATE-FUNCTIONALIZED ALKYD COATING COMPOSITIONS

(75) Inventors: Thauming Kuo, Kingsport, TN (US); Paul Vincent Grosso, Algonquin, IL (US); Gary Eugene Spilman, Lake In The Hills, IL (US); Mark Dwight Clark, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 10/121,754

(22) Filed: Apr. 12, 2002

(65) Prior Publication Data

US 2003/0195305 A1 Oct. 16, 2003

(51) Int. Cl.[7] .................. C08G 63/49; C08G 63/91; C09D 167/08
(52) U.S. Cl. ............... 428/481; 428/480; 524/601; 524/604; 525/447; 528/295.5
(58) Field of Search ............... 525/447; 528/295.5; 524/601, 604; 428/481, 480

(56) References Cited

U.S. PATENT DOCUMENTS

| | | | |
|---|---|---|---|
| 2,730,517 A | * | 11/1956 | Vogel .................. 528/295.5 |
| 3,196,119 A | | 7/1965 | Boller et al. |
| 3,258,475 A | | 6/1966 | Faulkner |
| 3,332,793 A | | 7/1967 | Dreher |
| 3,438,795 A | | 4/1969 | Schroeder et al. |
| 3,641,201 A | | 2/1972 | Hellman |
| 3,734,874 A | | 5/1973 | Kibler et al. |
| 4,113,702 A | | 9/1978 | Psencik |
| 4,131,579 A | | 12/1978 | Mummenthey et al. |
| 4,474,941 A | | 10/1984 | Wilk et al. |
| 4,622,072 A | | 11/1986 | Turner |
| 4,690,980 A | | 9/1987 | Singer et al. |
| 4,719,254 A | | 1/1988 | Levine |
| 4,973,656 A | | 11/1990 | Blount |
| 5,051,529 A | | 9/1991 | Witzeman et al. |
| 5,218,042 A | | 6/1993 | Kuo et al. |
| 5,288,804 A | | 2/1994 | Kim et al. |
| 5,349,026 A | | 9/1994 | Emmons et al. |
| 5,371,148 A | | 12/1994 | Taylor et al. |
| 5,378,757 A | | 1/1995 | Blount, Jr. et al. |
| 5,484,849 A | | 1/1996 | Bors et al. |
| 5,498,659 A | | 3/1996 | Esser |
| 5,530,059 A | | 6/1996 | Blount, Jr. et al. |
| 6,187,384 B1 | * | 2/2001 | Wilke et al. ............ 427/388.4 |
| 6,187,385 B1 | | 2/2001 | Atkins |
| 6,262,149 B1 | | 7/2001 | Clark et al. |
| 6,344,503 B1 | | 2/2002 | Nkansah et al. |

FOREIGN PATENT DOCUMENTS

| | | |
|---|---|---|
| EP | 0 227 454 A2 | 7/1987 |
| EP | 0 351 024 A2 | 1/1990 |
| EP | 0 549 865 A1 | 7/1993 |
| EP | 0 570 213 A2 | 11/1993 |
| EP | 0 849 341 A2 | 6/1998 |
| EP | 1002842 A1 | 5/2000 |
| EP | 1 057 857 A2 | 12/2000 |
| GB | 791325 A | 2/1958 |
| GB | 2 045 266 A | 10/1980 |
| JP | 48085628 | 11/1973 |
| WO | WO 95/03350 A1 | 2/1995 |
| WO | WO 96/41833 A1 | 12/1996 |
| WO | WO 99/31162 A1 | 6/1999 |
| WO | WO 01/00741 A1 | 1/2001 |
| WO | WO 02/33008 A1 | 4/2002 |

OTHER PUBLICATIONS

F. Del Rector et al., Journal of Coatings Technology, pp. 31–37, vol. 61, No. 771, Apr. 1989.
Oldring et al, Resins for Surface Coatings, 1987, vol. 1, p. 127.
Oldring et al, Resins for Surface Coatings, 1987, vol. 1, p. 181.
Calbo, Handbook of Coatings Additives, 1987, pp. 496–506.
Witzeman, et al, Journal of Coatings Technology, 1990, vol. 62, No. 789, pp. 101–112.
U.S. patent application Ser. No. 10/121,229, Kuo et al., filed Apr. 12, 2002.

* cited by examiner

*Primary Examiner*—Patricia A. Short
(74) *Attorney, Agent, or Firm*—Michael K. Carrier; Bernard J. Graves, Jr.

(57) ABSTRACT

A waterborne acetoacetate-functionalized alkyd coating composition is disclosed which includes an acetoacetate-functionalized alkyd resin, at least one drier, and water. The acetoacetate-functionalized alkyd resin is the reaction product of (i) an alkyd resin, and (ii) an alkyl acetoacetate. Also disclosed is a method of preparing a waterborne acetoacetate-functionalized alkyd coating composition which includes the step of contacting an acetoacetate-functionalized alkyd resin with at least one drier in the presence of water.

17 Claims, No Drawings

WATERBORNE ACETOACETATE-FUNCTIONALIZED ALKYD COATING COMPOSITIONS

FIELD OF THE INVENTION

The invention relates to waterborne coating compositions, and more particularly, to waterborne coating compositions having acetoacetate-functionalized alkyd resins.

BACKGROUND OF THE INVENTION

In recent years, considerable efforts have been made by the coatings industry to develop coating formulations containing little or no volatile organic compound (VOC) content. Regulations to limit the amount of VOCs in industrial coatings have encouraged research and development to explore new technologies directed at reducing solvent emissions from industrial solvent-based coatings operations in such products as automobiles, appliances, general metal products, furniture, and the like. However, while the move to reduced organic solvent-based compositions brings health and safety benefits, these lower VOC content coating compositions must still meet or exceed the performance standards expected from solvent-based compositions.

Alkyd resins are one of the most common binders used for ambient-cure, solvent-based coatings. The resistance properties of traditional solvent-borne alkyd resins are developed via autooxidative crosslinking of the alkyd film. Crosslinking occurs when the activated methylene groups in the unsaturated fatty acids or oils of the alkyd are oxidized in air to give hydroperoxides which subsequently decompose to generate free radicals, causing oxidative crosslinking. This oxidative crosslinking process is commonly accelerated by adding driers, such as, for example, various salts of cobalt, zirconium, calcium, and manganese. However, while alkyd resins have shown, and continue to show, promise, they have relatively slow "dry" and/or cure times, particularly at ambient temperatures. Various modifications have been made to alkyd resins to address such concerns.

One such attempt includes polymerization of an alkyd resin with a vinyl compound, such as styrene or methyl methacrylate, via a free-radical reaction, to produce a vinyl-alkyd copolymer or a vinyl alkyd. Vinyl alkyd resins generally have a higher molecular weight and a higher Tg, producing coatings with reduced tack-free time (solvent evaporation). However, the through-dry time (oxidation of the film) of such coatings takes longer due to the decreased degree of unsaturation in the alkyd as a result of copolymerization with the vinyl compound. This problem is described in further detail in Resins for Surface Coatings, Vol. 1, p. 181, ed. by P. K. T. Oldring and G. Hayward, SITA Technology, London, UK, 1987, which is incorporated herein by reference. An additional drawback is that paint formulations containing vinyl alkyd resins require greater amounts of solvent, due to the increased molecular weight and Tg of the vinyl alkyd.

Various methods for the preparation of acetoacetylated coating resins have been described by J. S. Witzeman et al. in the Journal of Coatings Technology, Vol. 62, No. 789, pp. 101–112 (1990). This document discloses acetoacetylation of polyester resins, and the application of such resins for baking enamels having a melamine crosslinker.

U.S. Pat. No. 5,484,849 discloses vinyl polymer compositions containing pendant acetoacetate functionality, which are curable in air in the presence of a source of free radicals. The vinyl polymers are prepared by free radical polymerization (i.e. emulsion polymerization) of an acetoacetate-functional monomer (e.g., acetoacetoxyethyl methacrylate) and other acrylic monomers. The patent also discloses that an autooxidizable compound is required to provide a source of free radicals to cure and to crosslink the acetoacetate functionality. As a result, a portion of the acetoacetate groups could be consumed during the free radical polymerization due to the reaction between the acetoacetate functionality and the free radicals. This could, in turn, lead to insufficient curing upon film formation. It is therefore desirable to provide an air-dry coating system based on acetoacetyl-functional polymers, prepared via a non-free radical reaction.

Thus, there still exists a need in the art for a modified or functionalized alkyd resin capable of undergoing crosslinking upon film formation, which can be used to prepare ambient oxidative cure, fast-dry, and waterborne coatings having low VOC content. Such coatings would exhibit the properties and advantages of high VOC coatings.

SUMMARY OF THE INVENTION

The invention provides a waterborne acetoacetate-functionalized alkyd coating composition comprising an acetoacetate-functionalized alkyd resin, at least one drier, and water. The acetoacetate-functionalized alkyd resin comprises the reaction product of (a) an alkyd resin, and (b) an alkyl acetoacetate.

The invention also relates to a method of preparing a waterborne acetoacetate-functionalized alkyd coating composition comprising the step of contacting an acetoacetate-functionalized alkyd resin with at least one drier in the presence of water.

DETAILED DESCRIPTION OF THE INVENTION

The invention provides a waterborne acetoacetate-functionalized alkyd coating composition comprising an acetoacetate-functionalized alkyd resin, at least one drier, and water. The acetoacetate-functionalized alkyd resin comprises the reaction product of (a) an alkyd resin, and (b) an alkyl acetoacetate as shown in FIG. (1).

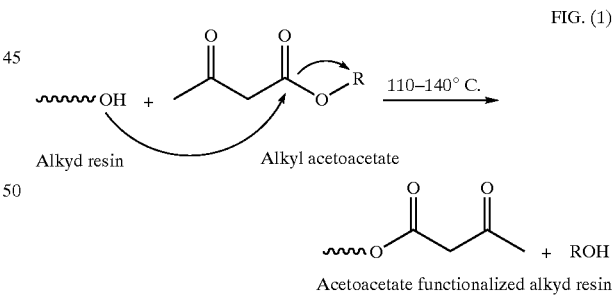

FIG. (1)

Any of a number of alkyl acetoacetates may be effectively used as acetoacetylating agents in the transesterification reaction to generate the acetoacetate-functionalized alkyd resin. Typically, the reaction is driven by the removal of the alcohol by-product as it is formed. Although halides are traditionally utilized as leaving groups, the various acetoacetate esters are easier to handle and to store.

In a preferred embodiment of the invention, a waterborne acetoacetate-functionalized alkyd coating composition contains from about 30 to about 60 wt %, based on the total weight of the composition, of an acetoacetate-functionalized alkyd resin, from about 40 to about 70 wt %, based on the total weight of the composition, of water, from 0 to about 30 wt %, based on the total weight of the composition, of an organic solvent, and from about 0.01–1.0 wt %, based on the total weight of the composition, of at least one drier.

Such an acetoacetate-functionalized alkyd resin exhibits superior tack-free time and through-dry time properties. Furthermore, the acetoacetate-functionalized alkyd of the invention exhibits superior tack-free time properties, which previously could only be improved by increasing the molecular weight and Tg of the alkyd resin. Because the amount of VOC generally added to alkyd resin compositions and/or formulations is directly related to the molecular weight and Tg of the alkyd resin, compositions or formulations containing an acetoacetate-functionalized resin of the invention would require less VOC.

In one embodiment of the invention, the acetoacetate-functionalized alkyd resin comprises the reaction product of: (a) from about 70 to about 97 wt % of an alkyd resin, and (b) from about 3 to about 30 wt % of an alkyl acetoacetate, each as described herein, wherein the weight percents are based on the total weight of (a) and (b).

Any alkyd resin may be used as an alkyd resin in a coating composition of the invention. An alkyd may be prepared by reacting a diol, a polyol, a polyacid, a monofunctional acid, and a fatty acid, fatty ester or naturally occurring, partially-saponified oil, optionally in the presence of a catalyst. More particularly, an alkyd resin is the reaction product of (i) from 0 to about 30 mol % of a diol, (ii) from about 10 to about 40 mol % of a polyol, (iii) from about 20 to about 40 mol % of a polyacid, (iv) from 0 to about 10 mol % of a monofunctional acid, (v) from about 10 to about 50 mol % of a fatty acid, fatty ester or naturally occurring oil, and, optionally (vi) a catalyst, wherein the mole percents are based on the total moles of (i), (ii), (iii), (iv), (v), and (vi), if present. Suitable examples of each of the components of the alkyd resin include those known in the art including, but not limited to, those discussed below, and in Resins for Surface Coatings, Vol. 1, p. 127, ed. by P. K. T. Oldring and G. Hayward, SITA Technology, London, UK, 1987, which is incorporated herein by reference.

The fatty acid, fatty ester, or naturally occurring, partially-saponified oil may be any fatty acid, fatty ester or naturally occurring, partially-saponified oil known in the art used in the formation of an alkyd resin. In a preferred embodiment, at least one monobasic fatty acid, fatty ester or naturally occurring, partially-saponified oil is used and selected from the following formulae (I), (II) and (III):

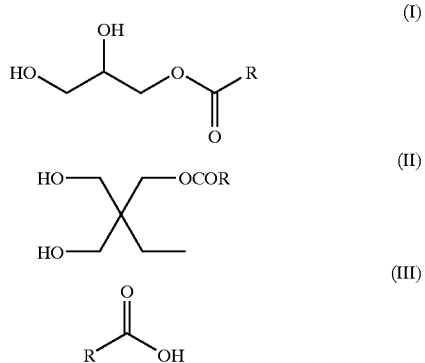

In formulae (I), (II) and (III), R is a saturated or unsaturated $C_8$–$C_{20}$ alkyl group. More particularly, R is one of the following unsaturated $C_{17}$ alkyl groups:

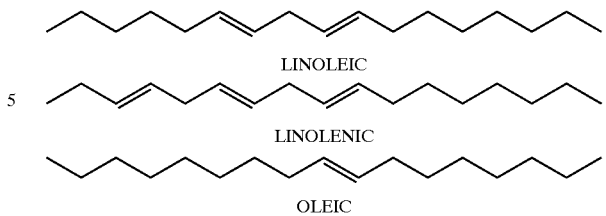

In another embodiment, the monobasic fatty acid or fatty ester oil may be prepared by reacting an oil or a fatty acid with a polyol. Examples of suitable oils include sunflower oil, canola oil, dehydrated castor oil, coconut oil, corn oil, cottonseed oil, fish oil, linseed oil, oiticica oil, soya oil, tung oil, animal grease, castor oil, lard, palm kernel oil, peanut oil, perilla oil, safflower oil, tallow oil, walnut oil, and the like. Suitable examples of fatty acids alone or as components of oil include, but are not limited to, tallow acid, soya acid, myristic acid, linseed acid, crotonic acid, versatic acid, coconut acid, tall oil fatty acid (e.g., PAMOLYN 200, commercially available from Eastman Chemical Co.), rosin acid, neodecanoic acid, neopentanoic acid, isostearic acid, 12-hydroxystearic acid, cottonseed acid, and the like.

The polyol used in the preparation of the alkyd resin itself, or the monobasic fatty acid or fatty ester, is preferably selected from aliphatic, alicyclic and aryl alkyl polyols. Suitable examples of polyols include, but are not limited to, trimethylolpropane (TMP), pentaerythritol (PE), trimethylolethane, erythritol, threitol, dipentaerythritol, sorbitol, glycerine, and the like. Preferably, the polyol is trimethylolpropane (TMP) or pentaerythritol (PE).

In addition to the polyol, a diol may be used in the preparation of the alkyd resin. Examples of suitable diols include, but are not limited to, neopentyl glycol (NPG), ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexanedimethanol, 1,3-cyclohexanedimethanol, 1,4-cyclohexanedimethanol, 2,2,4-trimethyl-1,3-pentanediol, 2,2,4-tetramethyl-1,3-cyclobutanediol, p-xylenediol, hydroxypivalyl hydroxypivalate, 1,10-decanediol, and hydrogenated bisphenol A. Preferably, the diol is neopentyl glycol (NPG).

The polyacid (dicarboxylic acid or tricarboxylic acid) and monofunctional acid (monocarboxylic acid) components of the alkyd resin may be any polyacid or monofunctional acid known in the art used in the formation of an alkyd resin. The dicarboxylic acid may be, for example, isophthalic acid, phthalic anhydride(acid), terephthalic acid, adipic acid, tetrachlorophthalic anhydride, dodecanedioic acid, sebacic acid, azelaic acid, 1,4-cyclohexanedicarboxylic acid, 1,3-cyclohexanedicarboxylic acid, hexahydrophthalic anhydride, tetrahydrophthalic anhydride, maleic anhydride, fumaric acid, succinic anhydride, succinic acid, 2,6-naphthalenedicarboxylic acid, glutaric acid, and the like. Preferably, the dicarboxylic acid is isophthalic acid, phthalic anhydride, or phthalic acid. The tricarboxylic acid may be, for example, trimellitic anhydride. A monofunctional acid may also be used, such as, for example, benzoic acid, acetic acid, propionic acid, t-butylbenzoic acid, and butanoic acid.

Optionally, a catalyst may be used to promote the formation of an alkyd resin. The catalyst may be any catalyst known in the art used in the formation of an alkyd resin. Preferably, the catalyst is an acid catalyst, such as, for example, FASCAT 4100. The amount of catalyst added promotes the formation of an alkyd resin, as described above, and may be determined by routine experimentation as understood by those skilled in the art. Preferably, a catalyst is added in amounts ranging from about 0.01–1.0 wt %, based on the amount of the reactants.

An alkyd resin may be prepared at a temperature range of about 170–250° C. In a preferred embodiment of the invention, an alkyd resin has a hydroxyl number of from about 30 to about 180 mg KOH/g, an acid number of from 0 to about 100 mg KOH/g, and a number average molecular weight of from about 700 to about 5000. It should be noted that the acid numbers stated in this invention include only the carboxyl groups, and not the acetoacetate groups, although the acetoacetate groups are also acidic and can increase the acid numbers.

In another embodiment of the invention, the alkyd resin further comprises from 2 to 10 mol % of a sulfomonomer. The difunctional sulfomonomer is utilized to promote water dispersibility, and may be a diacid, or a derivative thereof, containing an —$SO_3M$ group. Suitable difunctional sulfomonomers are described in U.S. Pat. Nos. 4,973,656, 5,218,042, and 5,378,757. The metal ion of the sulfonate salt group may be $Na^+$, $Li^+$, $K^+$, $Mg^{2+}$, $Ca^{2+}$, $Cu^{2+}$, $Fe^{2+}$, or $Fe^{3+}$. Preferably, the metal ion is a monovalent cation.

The —$SO_3M$ group may be attached to an aromatic nucleus, examples of which include, but are not limited to, benzene, naphthalene, anthracene, diphenyl, oxydiphenyl, sulfonyldiphenyl and methylenediphenyl. For example, the difunctional monomer may be a sodium salt of a sulfoterephthalic acid, 5-sulfoisophthalic acid, sulfophthalic acid, 4-sulfonaphthalene-2,7-dicarboxylic acid, dimethyl 5-sulfoisophthalic acid, or a derivative of such acids. Preferably, the difunctional sulfomonomer is 5-(sodiosulfo)-isophthalic acid, 5-(lithiosulfo)-isophthalic acid, or methyl esters thereof. The most preferred difunctional sulfomonomer is 5-(sodiosulfo)-isophthalic acid (SIP).

The SIP-containing alkyd may be prepared by pre-reacting NPG and SIP, at a temperature range of about 150–190° C., followed by the reaction with other reactants. The preferred acid number of the SIP-containing alkyd resin is from 0 to about 20 mg KOH/g.

To enhance water dispersibility, another preferred embodiment of the coating composition further comprises an amine. The amine is added to neutralize the carboxyl groups in an acetoacetate-functionalized alkyd resin to yield ammonium salts which are water dispersible. The amine is present in an amount sufficient to neutralize 70–100% of the carboxyl groups in the acetoacetate-functionalized alkyd resin. The preferred acid number of the acetoacetate-functionalized alkyd resin before neutralization is about 40 to about 70 mg KOH/g. Typical amines include, but are not limited to, ammonia, trimethylamine, triethylamine, diethylamine, monoethanolamine, monoisopropanolamine, morpholine, ethanolamine, diethanolamine, N,N-dimethylethanolamine, N,N-diethylethanolamine, and N-methyldiethanolamine.

When an acetoacetate-functionalized alkyd resin has a low acid number such as from 0 to about 30, a surfactant may be added to effect the successful emulsification of the alkyd resin in water, with or without an amine. The surfactant may also enhance water dispersibility. Suitable surfactants for alkyd emulsification may be anionic, cationic, or nonionic surfactants. Examples of anionic surfactants include alkali metal or ammonium salts of fatty acids; alkyl, aryl or alkyl aryl sulfonates, sulfates, phosphates, and mixtures thereof. Examples of nonionic surfactants include alkyl and alkylaryl polydiol ethers such as ethoxylation products of lauryl, oleyl and stearyl alcohols, and alkylphenol glycol ethers such as ethoxylation products of octylphenol or nonylphenol.

In another embodiment of the invention, an acetoacetate-functionalized alkyd resin is prepared by reacting: (a) from about 85 to about 95 wt % of an alkyd resin, and (b) from about 5 to about 15 wt % of t-butyl acetoacetate at about 100–140° C., until the desired amount of the condensate, t-butanol, is obtained, wherein the weight percents are based on the total weight of (a) and (b).

Suitable alkyl acetoacetates used for the preparation of acetoacetate-functionalized alkyd resins include t-butyl acetoacetate, ethylacetoacetate, methyl acetoacetate, isobutyl acetoacetate, isopropyl acetoacetate, n-propyl acetoacetate, and n-butyl acetoacetate. t-Butyl acetoacetate is preferred.

The drier of an ambient cure composition of the invention may be any drier known in the art. Examples of suitable driers include, but are not limited to, various salts of cobalt, zirconium, calcium, zinc, lead, iron, cerium, aluminium, and manganese. Preferably, the drier is a cobalt drier. Mixtures of driers (i.e. a drier system) may also be used. These driers are normally used as octoates or naphthenates, in an amount of from 0.005–0.5 wt % metal, based on the weight of the alkyd resin. Examples of commercial products are Zirconium HEX-CEM, Cobalt TEN-CEM, Calcium CEM-ALL, Zirconium HYDRO-CEM, and Cobalt HYDRO-CURE II sold by OMG Americas of Westlake, Ohio. A description of metal driers, their functions, and methods for using them, may be found in *Handbook of Coatings Additives*, p. 496–506, ed. by L. J. Calbo, Marcel Dekker, Inc. New York, N.Y., 1987, which is incorporated herein by reference.

In a preferred embodiment of the invention, a waterborne acetoacetate-functionalized alkyd coating composition, as described above, may also contain at least one pigment to form an acetoacetate-functionalized alkyd coating enamel composition. Preferably, the pigment is present in an amount of from about 30 to about 60 wt %, based on the total weight of the composition. Examples of suitable pigments include those recognized by those of ordinary skill in the art of surface coatings. For example, the pigment may be a typical organic or inorganic pigment, especially those set forth by the Colour Index, 3d Ed., 2d Rev., 1982, published by the Society of Dyers and Colourists in association with the American Association of Textile Chemists and Colorists, which is incorporated herein by reference. Other examples of suitable pigments include, but are not limited to, titanium dioxide, barytes, clay or calcium carbonate, CI Pigment White 6 (titanium dioxide), CI Pigment Red 101 (red iron oxide), CI Pigment Yellow 42, CI Pigment Blue 15, 15:1, 15:2, 15:3, 15:4 (copper phthalocyanines); CI Pigment Red 49:1 and CI Pigment Red 57:1. Preferably, the pigment is titanium oxide. Colorants such as, for example, phthalocyanine blue, molybdate orange, or carbon black may also be added to the ambient cure oxidative cure enamel composition.

A waterborne acetoacetate-functionalized alkyd coating composition of the invention may further contain at least one coating additive known in the art. Examples of suitable coating additives include, but are not limited to, leveling and flow control agents such as silicones, fluorocarbons or cellulosics, extenders, plasticizers, flatting agents, pigment wetting and dispersing agents; ultraviolet (UV) absorbers, UV light stabilizers, defoaming and antifoaming agents, anti-settling, anti-sag and bodying agents, anti-skinning agents, anti-flooding and anti-floating agents, and corrosion inhibitors. Specific examples of such additives can be found in Raw Materials Index, published by the National Paint & Coatings Association, 1500 Rhode Island Avenue, N.W., Washington, D.C. 20005, which is incorporated herein by reference. Further examples of such additives may be found in U.S. Pat. No. 5,371,148, which is likewise incorporated herein by reference.

Examples of flatting agents include, but are not limited to, synthetic silica, available from the Davison Chemical Division of W. R. Grace & Company as SYLOID®; polypropylene, available from Hercules Inc., as HERCOFLAT®; and synthetic silicate, available from J. M. Huber Corporation, as ZEOLEX®.

Examples of dispersing agents include, but are not limited to, sodium bis(tridecyl) sulfosuccinate, di-(2-ethyl hexyl) sodium sulfosuccinate, sodium dihexylsulfosuccinate, sodium dicyclohexyl sulfosuccinate, diamyl sodium sulfosuccinate, sodium diisobutyl sulfosuccinate, disodium iso-decyl sulfosuccinate, disodium ethoxylated alcohol half ester of sulfosuccinic acid, disodium alkyl amido polyethoxy sulfosuccinate, tetra-sodium N-(1,2-dicarboxyethyl)-N-octadecyl sulfosuccinamate, disodium N-octasulfosuccinamate, sulfated ethoxylated nonylphenol, 2-amino-2-methyl-1-propanol, and the like.

Examples of viscosity, suspension, and flow control agents include, but are not limited to, polyaminoamide phosphate, high molecular weight carboxylic acid salts of polyamine amides, and alkylene amine salts of an unsaturated fatty acid, all available from BYK Chemie U.S.A. as ANTI TERRA®. Further examples include, but are not limited to, polysiloxane copolymers, polyacrylate solution, cellulose esters, hydroxyethyl cellulose, hydroxypropyl cellulose, polyamide wax, polyolefin wax, hydroxypropyl methyl cellulose, polyethylene oxide, and the like.

Several proprietary antifoaming agents are commercially available and include, but are not limited to, BUBREAK® of Buckman Laboratories Inc.; BYK® of BYK Chemie, U.S.A.; FOAMASTER® and NOPCO® of Henkel Corp./Coating Chemicals; DREWPLUS® of the Drew Industrial Division of Ashland Chemical Company; TRYSOL® and TROYKYD® of Troy Chemical Corporation; and SAG® of Union Carbide Corporation.

Examples of U.V. absorbers and U.V. light stabilizers include, but are not limited to, substituted benzophenone, substituted benzotriazoles, hindered amines, and hindered benzoates, available from American Cyanamid Company as CYASORB UV®, diethyl-3-acetyl-4-hydroxy-benzylphosphonate, 4-dodecyloxy-2-hydroxy benzophenone, and resorcinol monobenzoate.

The waterborne acetoacetate-functionalized alkyd composition may contain from 0 to about 30 wt %, preferably 0 to about 10 wt %, based on the total weight of the composition, of an organic solvent. Preferred organic solvents are water miscible and include, but are not limited to, ethanol, n-propanol, isopropanol, n-butanol, sec-butanol, isobutanol, ethylene glycol, monobutyl ether, propylene glycol n-butyl ether, propylene glycol methyl ether, propylene glycol monopropyl ether, dipropylene glycol methyl ether, and diethylene glycol monobutyl ether.

The invention also provides a method of preparing a waterborne acetoacetate-functionalized alkyd coating composition comprising the step of combining an acetoacetate-functionalized alkyd resin with at least one drier in the presence of water, each as described above. An acetoacetate-functionalized alkyd resin may be prepared as described above. Preferably, the acetoacetate-functionalized alkyd resin is reacted with at least one drier, present in amount of about 0.01–1.0 wt % in water.

The following examples are given to illustrate the invention. It should be understood, however, that the invention is not to be limited to the specific conditions or details described in these examples.

The examples of various coating compositions of the invention use the following materials not already described above:

PAMOLYN 200, a tall oil fatty acid, sold by Eastman Chemical Co. of Kingsport, Tenn.

FASCAT 4100 and FASCAT 4350, esterification catalysts, sold by M&T Chemicals of Rahway, N.J.

Zirconium HYDRO-CEM, a zirconium carboxylate, sold by OMG Americas of Westlake, Ohio.

Cobalt HYDRO-CURE II, a cobalt carboxylate, sold by OMG Americas of Westlake, Ohio.

Silwet L-77, a polyalkyleneoxide modified heptamethyltrisiloxane, sold by OSI Specialities of Danbury, Conn.

SCS 4682, SCS 4683, SCS 4712 and Atlas G-3300B, non-migratory surfactants, sold by Uniqema of New Castle, Del.

The following method was used to evaluate the coatings and films prepared according to the invention.

Through-Dry Thumb Test: The coating is considered "through-dry" if it is not affected (no wrinkling) by pressing and twisting with the thumb on the surface of the film.

EXAMPLES

Example 1

Preparation of Waterborne Alkyd Resin 1

An NPG/SIP adduct was first prepared by reacting neopentyl glycol (NPG) (827 g, 7.95 mol), 5-sodiosulfoisophthalic acid (SIP) (536 g, 2.00 mol), water (91.9 g), and the acid catalyst FASCAT 4100 (1.10 g) in a three-neck, round-bottom flask equipped with a mechanical stirrer, a steam-jacketed partial condenser, a Dean-Stark trap, a nitrogen inlet, and a water condenser. The reaction temperature was gradually increased from 110–150° C. in a 45-min period, and the distillate collected in the Dean-Stark trap. The reaction was allowed to continue at 150–180° C. for 3 hrs, and at 190° C. for 4.5 hrs, until an acid number of 3.0 mg KOH/g was obtained. A portion of the resultant product was used in the following step.

In a separate reactor equipped with the same configuration as above were charged neopentyl glycol (NPG) (48.4 g, 0.47 mol), the above NPG/SIP adduct (148 g), pentaerythritol (PE) (42.9 g, 0.32 mol), isophthalic acid (IPA) (97.2 g, 0.59 mol), and FASCAT 4100 (0.34 g). The mixture was allowed to react at 170–190° C. until 16.0 g of the condensate (water) was obtained. After the mixture was cooled, PAMOLYN 200 (Eastman) (423 g, 1.46 mol) was added. The reaction was allowed to continue at 170–220° C. until an acid number of 9.1 mg KOH/g was obtained. The resulting resin was allowed to cool and subsequently collected.

Example 2

Preparation of Acetoacetate-functionalized Alkyd Resin 1

To a three-neck, round-bottom flask equipped with a mechanical stirrer, a steam-jacketed partial condenser, a Dean-Stark trap, a water condenser, and a nitrogen inlet, were charged the alkyd resin of Example 1 (150 g) and t-butyl acetoacetate (t-BAA) (16.7 g, 0.105 mol). The reaction mixture was stirred at 100° C. for 30 min and then at 110° C. for 1.5 hrs while the distillate was collected in the Dean-Stark trap. The reaction was allowed to continue at 120° C. for 1 hr, at 130° C. for 30 min, and at 140° C. for 30 min, during which a total of 7 mL of distillate was collected. The mixture was then allowed to cool and the resulting resin collected.

Example 3

Coating Formulations

A coating formulation was prepared by mixing the acetoacetate-modified alkyd resin 1 (10.0 g) prepared in Example 2 with water (14.6 g), a drier blend (0.34 g), and Silwet L-77 (OSI Specialties) (0.06 g). A control formulation was also prepared using the unmodified resin from Example 1. The drier blend was prepared by mixing Zirconium HYDRO-CEM (12%, OMG Americas) (26.9 g), Cobalt HYDRO-CURE II (OMG Americas) (13.1 g), and ethylene glycol monobutyl ether (EB) (10.0 g).

Example 4

Film Dry Time

The above coating formulations (70% solids) were drawn down on Leneta chart (3 mil wet thickness) and allowed to dry in air at room temperature. The results of the Through-Dry Thumb test are listed in the table below:

|  | Through-Dry Time (hr) |
| --- | --- |
| Unmodified Alkyd 1 | >7 days |
| Acetoacetate Alkyd 1 | 20 hrs* |

*Film surface remained slightly tacky

As shown in the above table, the dry times of the alkyds were significantly improved by modifying with t-BAA, and the higher the t-BAA ratio, the shorter the dry time.

Example 5

Preparation of Alkyd Resin 2

To a three-neck, round-bottom flask equipped with a mechanical stirrer, a steam-jacketed partial condenser, a Dean-Stark trap, a nitrogen inlet, and a water condenser, were charged pentaerythritol (PE) (425 g), trimethylolpropane (TMP) (174 g), soybean oil (2351 g), and FASCAT 4350 (0.39 g). The mixture was allowed to react at 238° C. for five hours in this alcoholysis step. To the mixture were then added isophthalic acid (IPA) (950 g) and the refluxing solvent, methyl isobutyl ketone (MIBK) (97.5 g). The reaction was allowed to continue at 238° C. until 203 mL of the condensate (water) was obtained. The acid number was determined to be 8.6 mg KOH/g. The resulting resin was allowed to cool and was isolated. It had a number average molecular weight (Mn) of 2,500, and a weight average molecular weight (Mw) of 200,000.

Example 6

Preparation of Acetoacetate-Functionalized Alkyd Resin 2

To a three-neck, round-bottom flask equipped with a mechanical stirrer, a steam-jacketed partial condenser, a Dean-Stark trap, a water condenser, and a nitrogen inlet, were charged the alkyd resin of Example 5 (202 g) and t-butyl acetoacetate (t-BM) (17.1 g, 0.108 mol). The reaction mixture was stirred at 100° C. for 30 min and then at 110° C. for 1.5 hrs, while the distillate was collected in the Dean-Stark trap. The reaction was allowed to continue at 120° C. for 30 min, at 130° C. for 30 min, and at 140° C. for 2 hrs, during which a total of 12.5 mL of distillate was collected. The mixture was then allowed to cool and the resulting resin collected.

Example 7

Emulsification of Acetoacetate-Functionalized Alkyd Resin

An acetoacetate-functionalized alkyd resin as prepared in Example 6 (500 g) was placed in a two-quart stainless steel beaker, followed by the Uniqema surfactants SCS 4682 (3.3 g), SCS 4683 (24.4 g), and SCS 4712 (3.3 g), and Atlas G-3300B. The mixture was brought to 50° C. under gentle agitation with a 2" Cowles blade. Once the proper temperature was reached, the addition of water (441 g), heated to 60° C., was started via an FMI pump. As the addition of water proceeded, the speed of the Cowles blade was gradually increased to 2000 rpm. Once the inversion of the emulsion was confirmed, the speed of the blade was reduced, and the remaining water was added to the emulsion.

It should be understood that the foregoing discussion and examples merely present a detailed description of certain preferred embodiments. It will be apparent to those of ordinary skill in the art that various modifications and equivalents can be made without departing from the spirit and scope of the invention. All the patents, journal articles, and other documents discussed or cited above are herein incorporated by reference.

We claim:

1. An acetoacetate-functionalized alkyd resin, comprising the reaction product of:
    (a) from about 70 to about 97 wt % of an alkyd resin, having an acid number of from 0 to about 100 mg KOH/g, the alkyd resin comprising the reaction product of:
        (i) a diol, in an amount of from 0 to about 30 mol %;
        (ii) a polyol, present in an amount of from about 10 to about 40 mol %;
        (iii) a polyacid, present in an amount of from about 20 to about 40 mol %;
        (iv) a monofunctional acid, in an amount of from 0 to about 10 mol %;
        (v) a fatty acid, a fatty acid ester, or a naturally occurring oil, present in an amount of from about 10 to about 50 mol %; and
        (vi) a sulfomonomer, present in an amount from about 2 to about 10 mol %,
    wherein the mole percents are based on the total moles of (i), (ii), (iii), (iv), (v) and (vi); and
    (b) about 3 to about 30 wt % of an alkyl acetoacetate,
    wherein the weight percents are based on the total weight of (a) and (b).

2. The acetoacetate-functionalized alkyd resin of claim 1, wherein:
    the diol comprises neopentyl glycol;
    the polyol comprises trimethyloipropane or pentaerythritol,
    the polyacid comprises isophthalic acid or phthalic anhydride; and the naturally occurring oil or fatty acid comprises soybean oil or tall oil fatty acid.

3. The acetoacetate-functionalized alkyd resin of claim 1, wherein the sulfomonomer comprises 5-sodiosutfoisophthalic acid.

4. A waterborne acetoacetate-functionalized alkyd coating composition, comprising:
(a) the acetoacetate-functionalized alkyd resin of claim 1;
(b) at least one drier; and
(c) water.

5. The waterborne acetoacetate-functionalized alkyd coating composition of claim 4, wherein:
the acetoacetate-functionalized alkyd resin is present in amount of from about 30 to about 60 wt %, based on the total weight of the composition;
the drier is present in an amount of from about 0.01 to about 1.0 wt %, based on the total weight of the composition; and
the water is present in an amount of from about 40 to about 70 wt %, based on the total weight of the composition.

6. The waterborne acetoacetate-functionalized alkyd coating composition of claim 4, wherein the drier comprises at least one member selected from the group consisting of a cobalt salt, a zirconium salt, a calcium salt, a zinc salt, and a manganese salt.

7. The waterborne acetoacetate-functionalized alkyd coating composition of claim 4, further comprising an amine.

8. A substrate coated with the waterborne acetoacetate-functionalized alkyd coating composition of claim 7.

9. The waterborne acetoacetate-functionalized alkyd coating composition of claim 4, further comprising a surfactant.

10. A substrate coated with the waterborne acetoacetate-functionalized alkyd coating composition of claim 9.

11. The waterborne acetoacetate-functionalized alkyd coating composition of claim 4, further comprising at least one member selected from the group consisting of a flow control agent, an extender, a plasticizer, a flatting agent, a pigment wetting agent, a pigment dispersing agent, an ultraviolet (UV) absorber, an ultraviolet (UV) light stabilizer, a tinting pigment, a colorant, a defoaming agent, an antifoaming agent, an anti-settling agent, an anti-sag agent, a bodying agent, an anti-skinning agent, an anti-flooding agent, an anti-floating agent, and a corrosion inhibitor.

12. A substrate coated with the waterborne acetoacetate-functionalized alkyd coating composition of claim 4.

13. A method of making a waterborne acetoacetate-functionalized alkyd coating composition, comprising the steps of combining:
(I) the acetoacetate-functionalized alkyd resin of claim 1;
(II) at least one drier; and
(III) water.

14. The method of claim 13, wherein:
the acetoacetate-functionalized alkyd resin is present in an amount of from about 30 to about 60 wt %, based on the total weight of the composition;
the drier is present in an amount of from about 0.01 to about 1.0 wt %, based on the total weight of the composition; and
the water is present in an amount of from about 40 to about 70 wt %, based on the total weight of the composition.

15. The method of claim 13, further comprising a step of adding a surfactant.

16. The method according to claim 13, wherein the drier comprises one or more of: a cobalt salt, a zirconium salt, a calcium salt, a zinc salt, or a manganese salt.

17. A method of making an emulsion, comprising a step of combining the acetoacetate-functionalized alkyd resin of claim 1 with at least one surfactant in the presence of water.

* * * * *